(12) United States Patent
Perry

(10) Patent No.: US 7,076,881 B1
(45) Date of Patent: Jul. 18, 2006

(54) DEVICE FOR MEASURING AND TEACHING SCALES OF UNITS

(76) Inventor: Betty F. Perry, 4832 Linshaw La., Virginia Beach, VA (US) 23455

( * ) Notice: Subject to any disclaimer, the term of this patent is extended or adjusted under 35 U.S.C. 154(b) by 48 days.

(21) Appl. No.: 11/026,900

(22) Filed: Dec. 30, 2004

(51) Int. Cl.
*G01B 3/02* (2006.01)

(52) U.S. Cl. .......................... 33/494; 33/434; 33/679.1

(58) Field of Classification Search ................. 33/494, 33/491, 483–484, 493, 434, 679.1, 755
See application file for complete search history.

(56) References Cited

U.S. PATENT DOCUMENTS

| 204,601 | A | * | 6/1878 | Perris | 33/494 |
| 975,689 | A | * | 11/1910 | Greenwood | 33/494 |
| 1,235,801 | A | * | 8/1917 | Hornig | 33/494 |
| 1,343,912 | A | * | 6/1920 | Funk | 33/494 |
| 1,497,492 | A | * | 6/1924 | Engel | 33/494 |
| 1,754,903 | A | * | 4/1930 | Nearing | 33/494 |
| 5,062,215 | A | * | 11/1991 | Schlitt | 33/755 |
| 5,735,058 | A | * | 4/1998 | Jimenez | 33/809 |
| 5,746,001 | A | * | 5/1998 | Fisher | 33/484 |
| 5,771,598 | A | * | 6/1998 | Lassberg | 33/494 |
| 5,881,469 | A | * | 3/1999 | Monck | 33/494 |
| 6,145,210 | A | * | 11/2000 | Walczynski | 33/458 |
| 6,192,594 | B1 | * | 2/2001 | Wackowski | 33/494 |
| 6,237,243 | B1 | * | 5/2001 | Cook | 33/770 |
| 6,243,959 | B1 | * | 6/2001 | Monck | 33/494 |
| 6,453,572 | B1 | * | 9/2002 | Cross et al. | 33/563 |
| 6,813,841 | B1 | * | 11/2004 | Ramsey | 33/494 |

* cited by examiner

*Primary Examiner*—Yaritza Guadalupe
(74) *Attorney, Agent, or Firm*—Richard C. Litman

(57) ABSTRACT

A teaching device for teaching students different scales of measure and aiding in the taking of accurate measurements by users of the device includes a first face that is marked with standard units of measure such as feet, inches, and fractions of inches. Each scale represents a different unit of measure scale and is arranged next to smaller scale in an order such that the feet measurement is arranged next to the inch scale. The inch measure is also arranged to the half-inch scale which is arranged next to the quarter inch scale. This continues such that each succeeding scale is arranged between a larger and smaller scale. A second face is marked with scales representing metric units of measurement. Each scale on the second face represents a unit of measurement on one order of magnitude smaller than the preceding scale.

9 Claims, 3 Drawing Sheets

DEVICE FOR MEASURING AND TEACHING SCALES OF UNITS

BACKGROUND OF THE INVENTION

The present invention relates to a device for teaching the use of scales that represent various units of measure and for easily measuring a distance between two points. The units of measure may include either standard or metric units. The standard units of measure may comprise feet, inches, and fractions of inches. The metric units of measure may include meters measured in hundredths, thousandths and ten thousandths of meters. More specifically, the invention relates to a device having standard units of measure represented on one side thereof and metric units represented on an opposite side thereof.

Known types of rulers exist that include a face having an upper edge marked with inches and fractions thereof. A lower edge of the face is marked with millimeters and centimeters.

Another type of ruler comprises three sides for use in aiding a draftsman. Various faces of the three sides are marked with different units or scales. The draftsman rotates the ruler to a desired unit of measurement to measure a distance of a line or between two points.

Neither of the aforementioned rulers provides various scales that are labeled and clearly show a relationship of the various standard scales to one another along with the various metric scales to one another.

BRIEF SUMMARY OF THE INVENTION

The instant invention is a ruler-type device that is approximately twelve and one-half inches long. The device is approximately one and one-half inches wide and one-eighth of an inch thick. It may comprise wood, plastic, metal, fabric, paper, rubber or any other material on which a scale can be permanently marked.

The device includes a first side that comprises two vertical lines. Each vertical line is spaced approximately one-quarter of an inch from each edge of the ruler. Five horizontal lines are placed on the ruler are spaced one-quarter of an inch apart. The first line is arranged approximately one-quarter of an inch from the top of the device.

In one embodiment, the device includes a side having a list of measurements that are vertically represented in an ascending or descending order. The standard measurement side of the device is labeled with the following abbreviations: ft. corresponding to feet; in. corresponding to inches; ½ in. corresponding to half-inches; ¼ in corresponding to quarter-inches; ⅛ in. corresponding to one-eighth inches; and, 1/16 in. corresponding to one-sixteenth of inches. These markings are provided between the vertical lines and the edges of the device. There are provided one hundred and ninety-two marks on the 1/16 inch scale. There are provided ninety-six marks on the ⅛ inch scale. Forty-eight marks are provided on the ¼ inch scale. Twenty-four marks are provided on the one half inch scale. A one foot mark is provided on the ft. scale. Each scale is a different color.

In one embodiment, the device includes a series of metric scales arranged in an ascending or descending order. A vertical line is provided approximately three-eighths of an inch from the left side. A second vertical line is provided approximately three-eights of an inch from the right side. Four horizontal lines are placed one-quarter inch apart from one another and span the distance between the vertical lines. A series of notations are provided between the vertical line nearest the left side and the left side and the vertical line nearest the right side and the right side. The following marks are provided "mm", "½ cm", "cm", and "dm". The "mm" represents millimeters. The "½ cm" mark represents half-centimeters. The "cm" represents centimeters. The "dm" represents decimeters. There are provided three hundred marks on the millimeter scale. There are provided sixty ½ centimeters. Thirty marks are provided across the centimeter scale. Ten marks are provided across the decimeter scale. Each scale is a different color.

It is an object of the invention to provide a teaching and measuring device that increases the ability of an individual to identify and precisely measure objects to at least a sixteenth of an inch when using a standard scale provided on the device.

It is another object of the invention to provide a teaching and measuring device that increases the ability of an individual to identify and precisely measure objects to at least a millimeter when using the metric scale provided on the device.

It is an object of the invention to provide a teaching device that includes a face having standard markings to denote a foot, inches, and fractions thereof. The fractions of inches may include half-inches, quarter-inches, eighth-inches, sixteenth-inches and thirty-seconds of an inch. Each scale is arranged next to a larger scale on one side and a smaller scale on the other side. Thus, the scales proceed from a foot measurement to an inch measurement and fractions of inches. In this manner the scales are measured in an ascending or descending order.

It is another object of the invention is to provide a teaching device having a face that includes metric scales including decimeters, centimeters, one-half centimeters and millimeters. Similarly, the scales that represent the metric measurements are arranged in either an ascending or descending order.

It is still another object of the invention to provide a teaching device that includes both standard and metric measurement scales on a single face of a ruler type device.

It is a further object of the invention to provide a clear, see-through device that comprises a ruler-type teaching device that includes a face having standard markings to denote a foot, inches, and fractions thereof. The fractions of inches may include half-inches, quarter-inches, eighth-inches, sixteenth-inches and thirty-seconds of an inch. Each scale is arranged next to a larger scale on one side and a smaller scale on the other side. Thus, the scales proceed from a foot measurement to an inch measurement and fractions of inches. In this manner the scales are measured in an ascending or descending order.

It is another object of the invention to provide a clear, see-through device that comprises a ruler-type teaching device that includes a face having metric scales including decimeters, centimeters, one-half centimeters and millimeters. Similarly, the scales that represent the metric measurements are arranged in either an ascending or descending order.

It is another object of the invention to provide a measuring device that includes different scales having different colors for easily discerning between the scales.

It is another object of the invention to provide a measuring and teaching device that visually represents equivalents of different denominations of scales.

Further objects, features and advantages of the invention will become apparent from a consideration of the following description and the included claims when taken in connection with the previous discussion and the accompanying drawings.

DETAILED DESCRIPTION OF THE INVENTION

Figure 1:
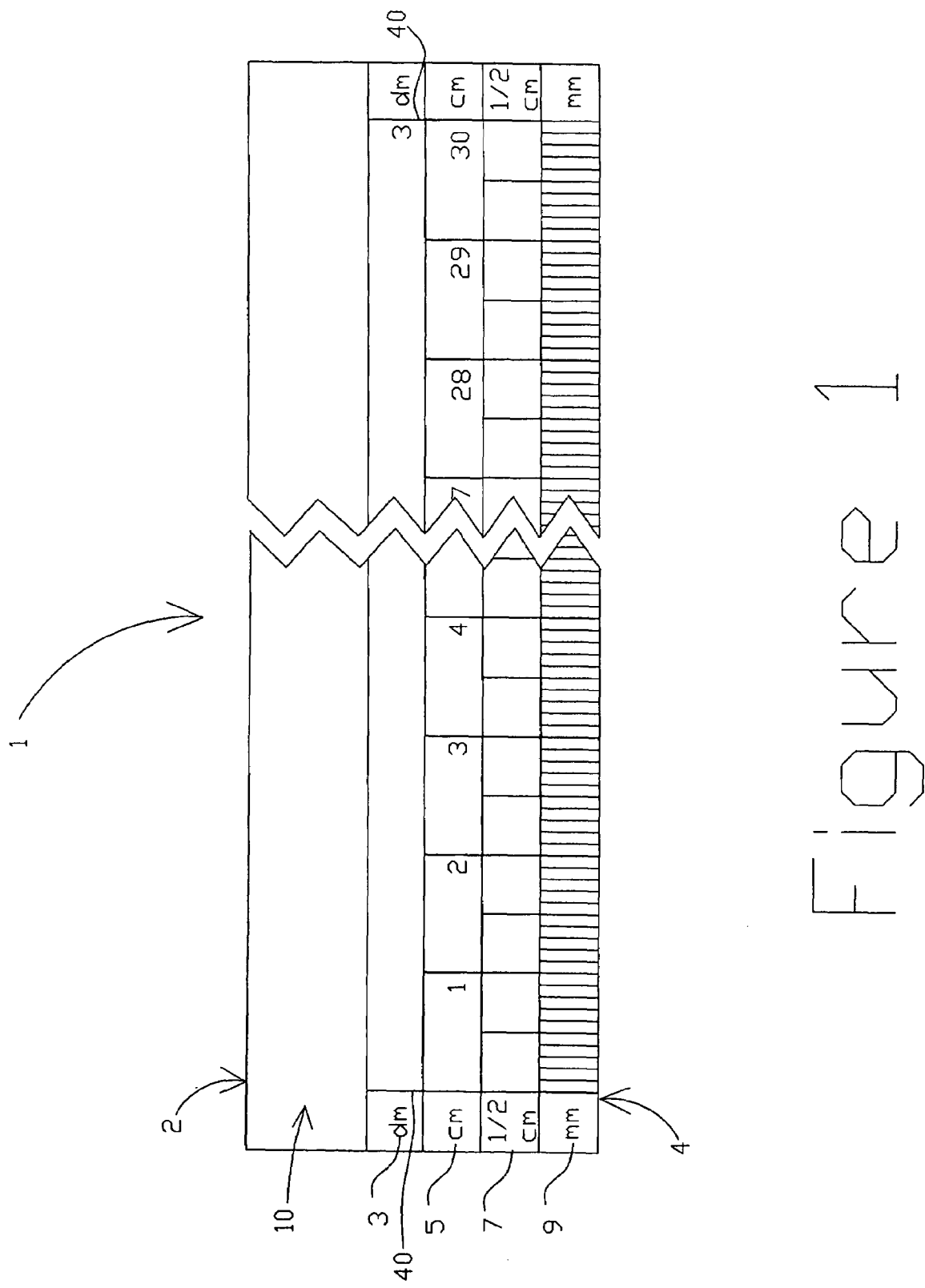
FIG. 1 is a view representing one side of the teaching device.

FIG. 1 shows a first side 10 of the device 1. The device comprises a top 2 and a bottom 4. The first side 10 includes several scales. Nearest bottom 4 is a millimeter scale 9. Provided above mm scale 9 is ½ cm scale 7. A cm scale 5 is arranged above ½ cm and below decimeter scale 3. As can be clearly seen, a user of the device 1 can easily recognize the relationship of the scales to one another. A vertical line 40 is provided at either side of the device.

Figure 2:
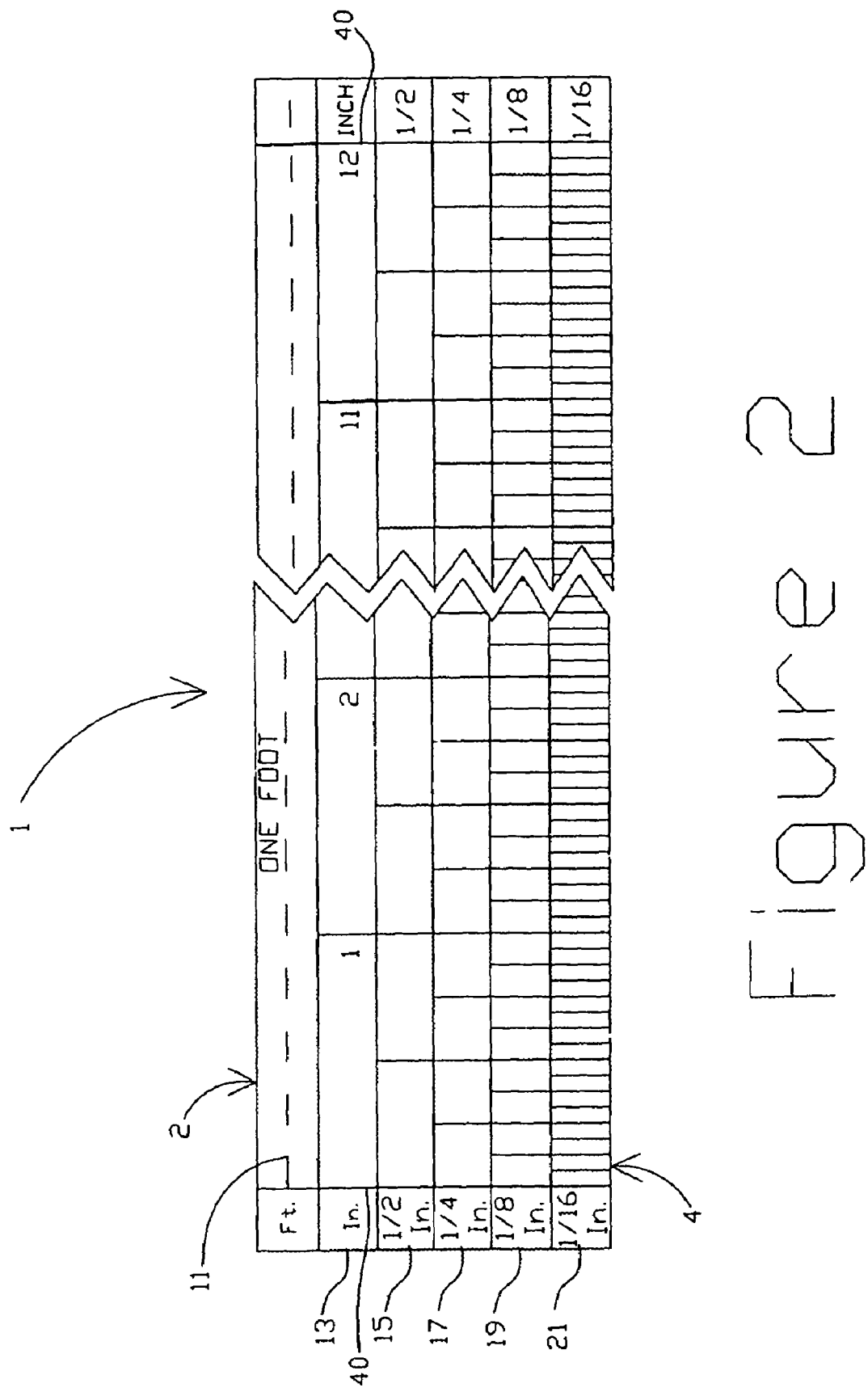
FIG. 2 is a view representing another side of the teaching device.

FIG. 2 is a second side 20 of the device 1. The second side of the device represents standard measurement scales. A 1/16 inch scale 21 is located nearest the bottom 4. A ⅛ inch scale 19 is arranged above the 1/16 inch scale 21 and below the ¼ inch scale 17. A ½ inch scale 15 is arranged below inch scale 13, which is in turn arranged above the foot scale 20. As can be realized, the scales are arranged such that there are twice as many lines as the scale arranged above it. This allows a user to quickly recognize the relationship between the various scales.

Figure 3:
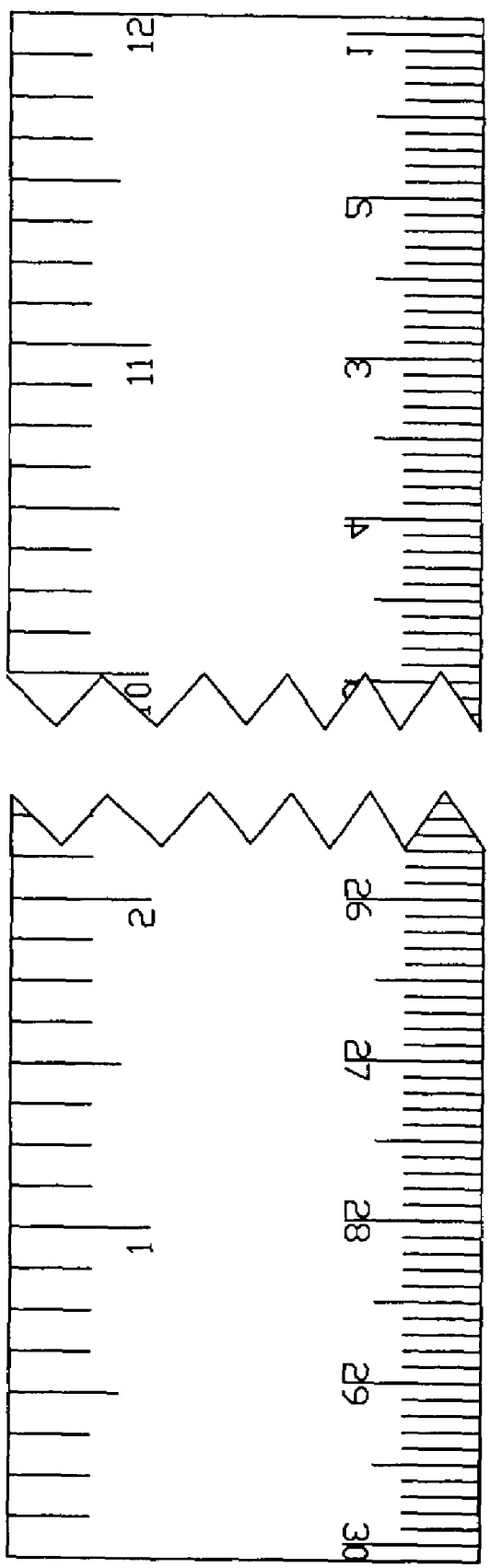
FIG. 3A is a prior art ruler.

FIG. 3 is a prior art type of ruler that comprises both metric and standard scales provided on one side thereof. The metric and standard scales are provided on separate scales. However, the standard scales show only inches and fractions thereof mixed together in a single scale. This is very confusing for one who is learning to read a ruler. Moreover, it is very difficult to recognize the relationship of one standard scale to another.

It is to be understood that the invention is not limited to the exact construction illustrated and described above. Various changes and modifications may be made without departing from the spirit and the scope of the invention as defined in the following claims.

The invention claimed is:

1. A learning and measuring device including a standard measurement scale, said learning and measuring device consisting of:
   a ruler-type structure having a first side and a second side, a top, a bottom, and a pair of ends, said ruler-type structure having a length of about twelve and one-half inches and a width of about one and one-half inches;
   said ruler-type structure first side including:
      (a) a first vertical line about three-eights of an inch from one of said ends of said ruler-type structure, and a second vertical line twelve inches from said first vertical line, said first and second vertical lines extending from said top to said bottom of said ruler-type structure;
      (b) a first horizontal line located about one-quarter inch from said top and extending between said ends, the area bounded by said top, said first and second vertical lines and said first horizontal line defining a foot scale;
      (c) a second horizontal line located about one-half inch from said top and extending between said ends, the area bounded by said first horizontal line, said first and second vertical lines, and said second horizontal line defining an inch scale, said inch scale being evenly divided by eleven vertical markings extending between said first and second horizontal lines;
      (d) a third horizontal line located about three-quarters of an inch from said top and extending between said ends, the area bounded by said second horizontal line, said first and second vertical lines, and said third horizontal line defining a one-half inch scale, said one-half inch scale being evenly divided by twenty-three vertical markings extending between said second and third horizontal lines;
      (e) a fourth horizontal line located about one inch from said top and extending between said ends, the area bounded by said third horizontal line, said first and second vertical lines, and said fourth horizontal line defining a one-quarter inch scale, said one-quarter inch scale being evenly divided by forty-seven vertical markings extending between said third and fourth horizontal lines;
      (f) a fifth horizontal line located about one and one-quarter inch from said top and extending between said ends, the area bounded by said fourth horizontal line, said first and second vertical lines, and said fifth horizontal line defining a one-eighth inch scale, said one-eighth inch scale being evenly divided by ninety-five vertical markings extending between said fourth and fifth horizontal lines;
      (g) the area bounded by said fifth horizontal line, said first and second vertical lines, and said bottom defining a one-sixteenth inch scale, said one-sixteenth inch scale being evenly divided by one-hundred, ninety-one vertical markings extending between said fifth horizontal line and said bottom.

2. The learning and measuring device of claim 1 wherein, each said scale comprises a different color.

3. The learning and measuring device of claim 1 wherein, said learning and measuring device is formed of a material selected from a group consisting of wood, plastic, metal, fabric, paper, rubber or any other material on which a scale can be permanently marked.

4. A learning and measuring device including a metric measurement scale, said learning and measuring device consisting of:
   a ruler-type structure having a first side and a second side, a top, a bottom, and a pair of ends, said ruler-type structure having a length of about twelve and one-half inches and a width of about one and one-half inches;
   said ruler-type structure second side including:
      (a) a first vertical line about three-eights of an inch from one of said ends of said ruler-type structure, and a second vertical line thirty centimeters from said first vertical line, said first and second vertical lines extending from said top to said bottom of said ruler-type structure;
      (b) a first horizontal line located about one-half inch from said top and extending between said ends;
      (c) a second horizontal line located about three-quarters of a an inch from said top and extending between said ends, the area bounded by said first horizontal line, said first and second vertical lines, and said second horizontal line defining a decimeter scale, said decimeter scale being evenly divided by two vertical markings extending between said first and second horizontal lines;

(d) an third horizontal line located about one inch from said top and extending between said ends, the area bounded by said second horizontal line, said first and second vertical lines, and said third horizontal line defining a centimeter scale, said centimeter scale being evenly divided by twenty-nine vertical markings extending between said second and third horizontal lines;

(e) a fourth horizontal line located about one and one-quarter inches from said top and extending between said ends, the area bounded by said third horizontal line, said first and second vertical lines, and said fourth horizontal line defining a half-centimeter scale, said half-centimeter scale being evenly divided by fifth-nine vertical markings extending between said third and fourth horizontal lines;

(f) the area bounded by said fourth horizontal line, said first and second vertical lines, and said bottom defining a millimeter scale, said millimeter scale being evenly divided by two-hundred, ninety-nine vertical markings extending between said fourth horizontal line and said bottom.

5. The learning and measuring device of claim 4 wherein, each said scale comprises a different color.

6. The learning and measuring device of claim 4 wherein, said learning and measuring device is formed of a material selected from a group consisting of wood, plastic, metal, fabric, paper, rubber or any other material on which a scale can be permanently marked.

7. A learning and measuring device including both standard and metric measurement scales, said learning and measuring device consisting of:

a ruler-type structure having a first side and a second side, a top, a bottom, and a pair of ends, said ruler-type structure having a length of about twelve and one-half inches and a width of about one and one-half inches;

said ruler-type structure first side including:

(a) a first vertical line about three-eights of an inch from one of said ends of said ruler-type structure, and a second vertical line twelve inches from said first vertical line, said first and second vertical lines extending from said top to said bottom of said ruler-type structure;

(b) a first horizontal line located about one-quarter inch from said top and extending between said ends, the area bounded by said top, said first and second vertical lines and said first horizontal line defining a foot scale;

(c) a second horizontal line located about one-half inch from said top and extending between said ends, the area bounded by said first horizontal line, said first and second vertical lines, and said second horizontal line defining an inch scale, said inch scale being evenly divided by eleven vertical markings extending between said first and second horizontal lines;

(d) a third horizontal line located about three-quarters of an inch from said top and extending between said ends, the area bounded by said second horizontal line, said first and second vertical lines, and said third horizontal line defining a one-half inch scale, said one-half inch scale being evenly divided by twenty-three vertical markings extending between said second and third horizontal lines;

(e) a fourth horizontal line located about one inch from said top and extending between said ends, the area bounded by said third horizontal line, said first and second vertical lines, and said fourth horizontal line defining a one-quarter inch scale, said one-quarter inch scale being evenly divided by forty-seven vertical markings extending between said third and fourth horizontal lines;

(f) a fifth horizontal line located about one and one-quarter inch from said top and extending between said ends, the area bounded by said fourth horizontal line, said first and second vertical lines, and said fifth horizontal line defining a one-eighth inch scale, said one-eighth inch scale being evenly divided by ninety-five vertical markings extending between said fourth and fifth horizontal lines; and (g) the area bounded by said fifth horizontal line, said first and second vertical lines, and said bottom defining a one-sixteenth inch scale, said one-sixteenth inch scale being evenly divided by one-hundred, ninety-one vertical markings extending between said fifth horizontal line and said bottom;

said ruler-type structure second side including:

(h) a third vertical line about three-eights of an inch from one of said ends of said ruler-type structure, and a fourth vertical line thirty centimeters from said third vertical line, said third and fourth vertical lines extending from said top to said bottom of said ruler-type structure;

(i) a sixth horizontal line located about one-half inch from said top and extending between said ends;

(j) a seventh horizontal line located about three-quarters of a an inch from said top and extending between said ends, the area bounded by said sixth horizontal line, said third and fourth vertical lines, and said seventh horizontal line defining a decimeter scale, said decimeter scale being evenly divided by two vertical markings extending between said sixth and seventh horizontal lines;

(k) an eighth horizontal line located about one inch from said top and extending between said ends, the area bounded by said seventh horizontal line, said third and fourth vertical lines, and said eighth horizontal line defining a centimeter scale, said centimeter scale being evenly divided by twenty-nine vertical markings extending between said seventh and eighth horizontal lines;

(l) a ninth horizontal line located about one and one-quarter inches from said top and extending between said ends, the area bounded by said eighth horizontal line, said third and fourth vertical lines, and said ninth horizontal line defining a half-centimeter scale, said half-centimeter scale being evenly divided by fifth-nine vertical markings extending between said eighth and ninth horizontal lines;

(m) the area bounded by said ninth horizontal line, said third and fourth vertical lines, and said bottom defining a millimeter scale, said millimeter scale being evenly divided by two-hundred, ninety-nine vertical markings extending between said ninth horizontal line and said bottom.

8. The learning and measuring device of claim 7 wherein, each said scale comprises a different color.

9. The learning and measuring device of claim 7 wherein, said learning and measuring device is formed of a material selected from a group consisting of wood, plastic, metal, fabric, paper, rubber or any other material on which a scale can be permanently marked.

* * * * *